Dec. 19, 1972 B. L. CAVERLY ET AL 3,706,576
PROCESS FOR PREPARING EDIBLE FAT COMPOSITIONS CONTAINING
TRIGLYCERIDES DERIVED FROM $C_{16}$, $C_{18}$, $C_{20}$, AND $C_{22}$
FATTY ACIDS
Original Filed Nov. 14, 1968 4 Sheets-Sheet 1

INVENTORS:
BRIAN LEONARD CAVERLY &
JOHN BARRY ROSSELL

BY THEIR ATTORNEY

United States Patent Office 3,706,576
Patented Dec. 19, 1972

3,706,576
PROCESS FOR PREPARING EDIBLE FAT COMPOSITIONS CONTAINING TRIGLYCERIDES DERIVED FROM $C_{16}$, $C_{18}$, $C_{20}$, AND $C_{22}$ FATTY ACIDS
Brian Leonard Caverly, Meopham, and John Barry Rossell, St. Albans, England, assignors to Lever Brothers Company, New York, N.Y.
Continuation of abandoned application Ser. No. 775,728, Nov. 14, 1968. This application Aug. 9, 1971, Ser. No. 170,382
Claims priority, application Great Britain, Nov. 20, 1967, 52,780/67
Int. Cl. A23d 5/00
U.S. Cl. 99—118 R                14 Claims

ABSTRACT OF THE DISCLOSURE

An edible unrandomised fat blend prepared from hardened oils and containing from 10 to 50% of a component A whose triglycerides have a $C_{16}$ and $C_{18}$ acid content of at least 90%, of which from 10 to 45% is saturated acid, and from 50 to 90% of a component B whose triglycerides have a $C_{20}$ and $C_{22}$ acid content of from 30 to 75% and not more than 20% saturated acid, both components having a $C_{18}$ monoethenoic radical in at least 85% of the glyceride 2-positions and a trans index of between 40 and 75, shows interaction of the components resulting in improvement of melting characteristics which make the blend suitable as a replacement for lauric fats.

---

This application is a continuation of application Ser. No. 775,728, Nov. 14, 1968, now abandoned.

This invention relates to a process for preparing edible fats and to edible fat compositions.

Coconut and palm kernel oils are used in the manufacture of fats that are solid at normal temperatures but are liquid at body temperature and hence melt in the mouth on consumption. The conversion of these oils to such fats is effected by hardening with hydrogen and a hydrogenation catalyst. These fats contain large amounts of lauric acid as triglycerides and show a tendency to develop off-flavours because deterioration on storage frees lauric acid and shorter-chain acids whose presence is easy to detect by their unpleasant taste in comparison with acids in other fats, for instance stearic and palmitic acids.

On the other hand many natural oils whose glycerides are free from lauric acid, on hardening to a fat that is adequately firm at 20° C., give a product that is unsatisfactory as a general purpose fat because their content of high-melting glycerides is such that they do not melt readily in the mouth, and resort must be had to fractionation to remove a "tail" of high-felting, waxy material. Many selectively hardened oils, for instance hardened cottonseed oil, show this disadvantage.

A method has now been found of upgrading certain hardened oils of this kind, by which the hardened oils are blended with other hardened oils and the tail is reduced or made to disappear as a result of an unexpected effect. The resulting fats are without the disadvantage due to the presence of lauric acid, and can be used as general purpose fats.

The melting properties of fats are now commonly defined by their dilatations at the temperatures concerned, dilatation being the isothermal melting expansion expressed in cubic millimetres and referred to 25 grams of material. The standard method of measuring dilatations for the purposes of this specification is that described in British Pat. 827,172. The dilatation of a fat gives an indication of the solids content of the fat at a particular temperature within its melting range. Dilatation curves can be drawn in which dilatation values are plotted against temperature, for instance for temperature ranges from 15° to 45° C. The steeper the curve the shorter is the range of temperatures between which the fat is essentially solid and liquid respectively.

Where a comparison of the melting properties of fats prepared by blending two component fats in various proportions is required, a series of superimposed dilatation curves for different compositions is usually unsatisfactory, because they differ in steepness and obscure one another by intersection. It has instead been found convenient to illustrate the melting properties of the blends by plotting dilatation curves, establishing the temperatures at which a series of blends in different proportions of the two components have a particular dilatation value, plotting these temperatures against blend compositions, and joining the points showing that dilatation value. The resulting curve is designated an isodilatation curve. The influence of blend composition on melting properties is then illustrated by a series of curves drawn for a series of dilatation values, for instance 50, 100, 200, 500, 800, 1000, 1200 and 1400 covering a complete range from solid fats to molten fats. As the resulting curves generally do not intersect, conclusions may more readily be drawn. The graph containing such a series of curves is designated as isodilatation diagram, and presents a contour map in which each contour is a line of equal dilatation value, and the closeness of the contours for any given composition indicates the steepness of the dilatation curve for that composition. It is therefore possible, provided sufficient curves are drawn, to obtain from the diagram the dilatation at any particular temperature, as well as the steepness of the dilatation curve, representing the sharpness of melting, for all compositions of blend, using interpolation where necessary.

Figure 1:
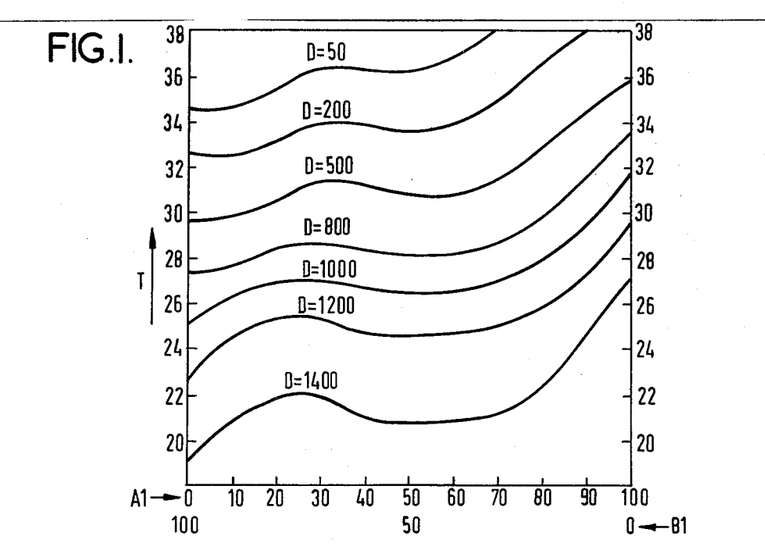
Figure 2:
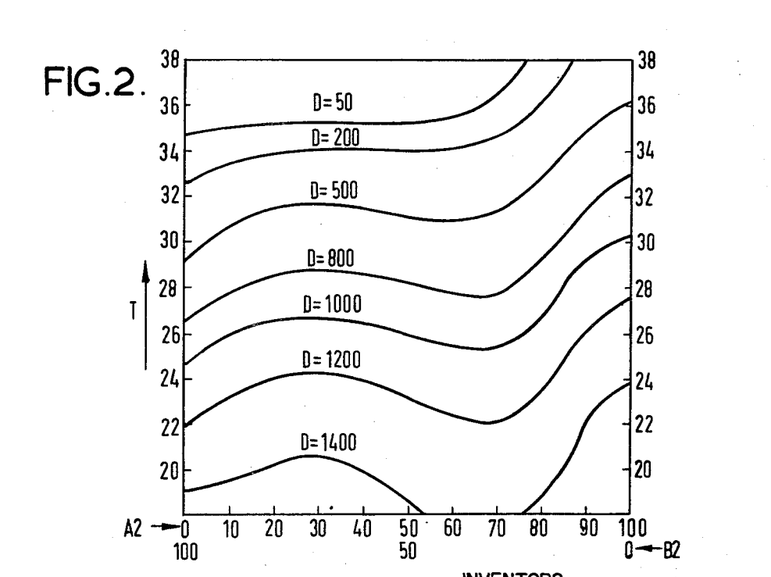
Figure 3:
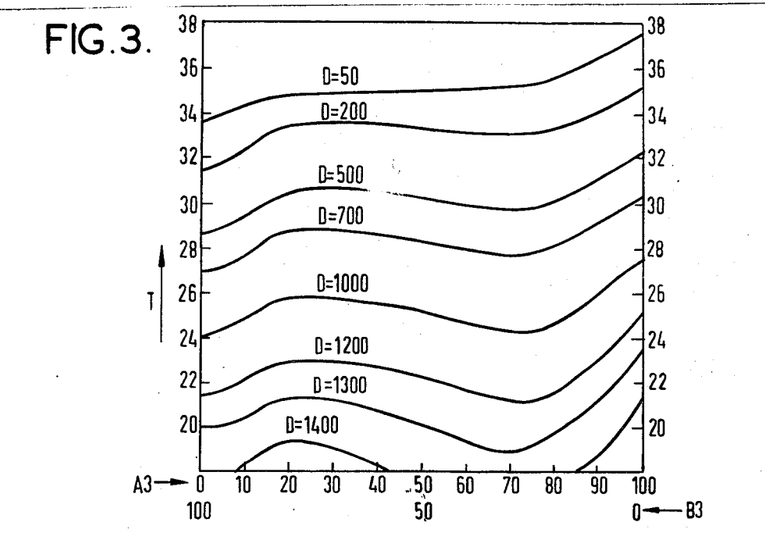
Figure 4:
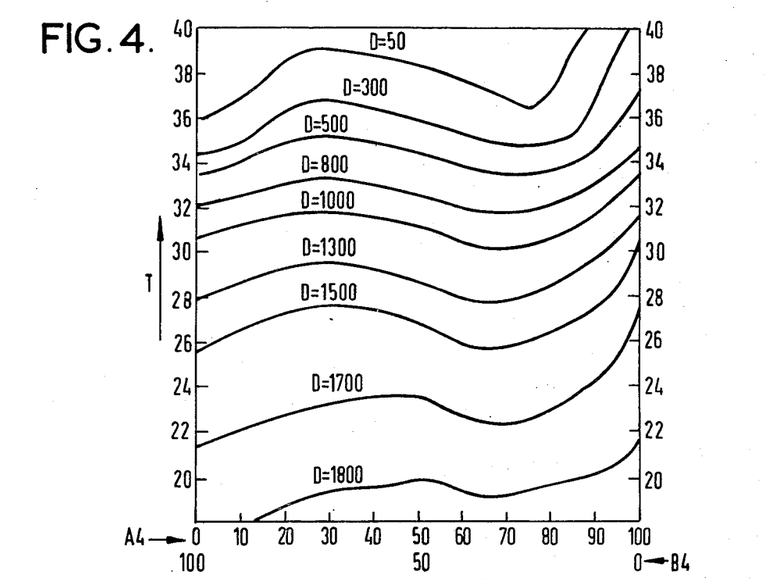

Such an isodilatation diagram is shown in FIG. 1 of the accompanying drawings, in which blends of from 0 to 100% of the selectively hydrogenated liquid palm oil (palm oleine) fraction A1 of Example 1 (see below) and from 100 to 0% of the selectively hydrogenated rapeseed oil B of Example 1, and temperature T in ° C. are represented by the axes and the isodilatation curves D are given for the series of dilatation values mentioned above. FIG. 1 reveals an unexpected maximum in the isodilatation curves at a blend of about 25% A1 and 75% B1, the maximum being very pronounced at low temperatures (see D=1400 isodilatation curve) and becoming less pronounced with increasing temperatures. While eutectic behaviour in isodilatation curves is normal with oil blends and FIG. 1 shows minima representing this behaviour, the neighbouring maxima take a form that suggest some kind of interaction or association between a large proportion of the glyceride molecules of one component and a large proportion of the glyceride molecules of the other, perhaps of the nature of a molecule compound. This is supported by the fact that if each component is interesterified before blending, the maxima disappear. The discovery of such maxima is important, as they represent properties unexpected from the properties of the blend components.

FIG. 1 shows that blends containing from 10 to 50% of A1 and 90 to 50% of B1 exhibit an isodilatation maximum especially at about 20° C., implying that their solids content is unexpectedly high at this temperature. On the other hand the minimum temperature at which such blends are wholly liquid is lower than would be accounted for by an interpolation of the properties of the components. This means that while the A1 component is unsatisfactory as a fat by itself, as it does not melt fully in the mouth, and the B1 component is not completely satisfactory by itself as it is not rigid enough at low temperatures for some purposes, the blends represented by the isodilatation maximum are satisfactory at both ends of the temperature range, and more satisfactory at each end than could have been predicted.

Differential thermal analysis of some of the compositions whose dilatations are represented in FIG. 1 has shown that a comparable maximum in latent heat of fusion of the blends also occurs, thus providing further evidence of the interaction.

The isodilatation diagrams for the following blends of oils described in the examples below and shown in FIGS. 2 to 7 of the accompanying drawings also reveal the new interaction phenomenon in a similar manner.

| Figure | Fat Component A | Fat Component B |
|---|---|---|
| 2 | Selectively hydrogenated cottonseed oil A2. | Selectively hydrogenated rapeseed oil B2. |
| 3 | Selectively hydrogenated groundnut oil A3. | Selectively hydrogenated rapeseed oil B3. |
| 4 | Stearine fraction A4 from selectively hydrogenated zero-erucic rapeseed oil. | Stearine fraction B4 from selectively hydrogenated rapeseed oil. |
| 5 | Stearine fraction A5 from selectively hydrogenated cottonseed oil. | Stearine fraction B5 from selectively hydrogenated rapeseed oil. |
| 6 | Stearine fraction A4 from selectively hydrogenated zero-erucic rapeseed oil. | Stearine fraction B5 from selectively hydrogenated crambe oil. |
| 7 | Selectively hydrogenated palm oleine fraction A6. | Selectively hydrogenated oleine fraction B7 from selectively hydrogenated rapeseed oil. |

In every instance the isodilatation curves reveal maxima.

Fats can exist in a variety of crystalline polymorphic forms, including those known as the alpha, beta and beta prime forms: these have different stability, melting point and density characteristics. The particular form in which a given fat crystallises depends not only on its glyceride composition, but on the temperature and rate of crystallisation. The polymorphic form of a crystalline fat can be determined by means of its X-ray powder diffraction pattern, and the above fat components and their blends have been submitted to this determination. It has been found that while the polymorphic form of fat components B present when dilatation measurements are made is a beta prime form, the fats change slowly over several weeks to a stable beta form. The polymorphic form of the fat components A present when dilatations measurements are made is the beta prime form; this is also usually the stable form, and component A4, where the stable form is the beta form, is exceptional. The polymorphic form of a blend of fat components A and B corresponding to the maxima in the isodilatation curves is beta prime when dilatation measurements are made, and this is also the stable form for that blend. Where the amount of fat component A is more than that corresponding to the isodilatation maxima, the blend is also stable in the beta prime form: however, where the amount of fat component A is less than that corresponding to the isodilatation maximum, the blend is unstable in the beta prime form, and slow transformation to the beta form takes place, the transformation being less slow as the content of fat component B is increased.

These polymorphic states are summarised in the following table.

| | Form during dilatation measurement | Stable form |
|---|---|---|
| Fat component: | | |
| A | Beta prime | Beta prime or beta. |
| B | do | Beta. |
| Blend corresponding to isodilatation maximum. | do | Beta prime. |

The maxima in the isodilatation curves are therefore associated with a new effect, namely the stabilisation of the beta prime form in a fat blend whose major component, fat component B, has on its own a stable beta form.

Fat components A are characterised by a high total $C_{16}$ and $C_{18}$ fatty acid content and fat components B by a high total $C_{20}$ and $C_{22}$ fatty acid content, the saturated and unsaturated acid radicals being arranged at the 1-, 2- and 3-positions of the glyceryl radicals in the triglyceride molecules in such a way that when the fats are blended interaction occurs between two types of triglyceride molecules present, one type being provided by the fat component A and the other by the fat component B. It may be that as in general the fat component A has a high content of PEE and PEP glycerides (P being a palmitic acid radical and E an elaidic acid type radical, that is, elaidic acid or its trans double bond-positional isomers) and the fat component B has a high content of BrEBr and BrEE glycerides (Br being a brassidic acid type radical), the interaction is caused by association between one or more pairs of these glycerides, and that this interaction involves only the beta prime form of the glycerides, with the tendency of the glycerides from the fat component B to go over to the beta form being completely suppressed in blends with amounts of the fat components A above those corresponding to the dilatation maxima. Such blends thus have a relatively simple polymorphic behaviour, the transformation from a beta prime to a beta form being inhibited: this is advantageous in edible fats, for this type of transformation can lead to bloom on chocolate goods and graininess or sandiness in softer fats, for instance, those used as biscuit filling creams.

The preparation of fats showing this interaction requires a mixing step, before or after hardening, of natural fats or fat fractions, as they cannot be obtained by direct hydrogenation and isomerisation of unblended natural fats with or without subsequent fractionation, for the proportions and distribution of the various fatty acid radicals are unsuitable; nor can they be obtained from interesterified fats, whether by interesterification of mixed fats or mixing of interesterified fats, for interesterification results in a random distribution of the acid radicals among the three positions of the glyceryl radical.

In a process of this invention an edible fat composition is prepared by forming a blend of from 10 to 50% by weight of an unrandomised fat component A the total fatty acids of whose triglycerides have a $C_{16}$ and $C_{18}$ acid content of at least 90% by weight, of which from 10 to 45% is saturated fatty acid, and from 50 to 90% of an unrandomised fat component B the total fatty acids of whose triglycerides have a $C_{20}$ and $C_{22}$ acid content of from 30 to 75% by weight and not more than 20% of saturated fatty acid, both components A and B having at least 85% of the 2-positions occupied by a $C_{18}$ monoethenoic acid radical, and a trans index of between 40 and 75.

By unrandomised fat is meant a fat of natural origin which has been submitted to the required isomerisation step with or without hydrogenation and fractionation, but without randomisation by interesterification, and retains the original distribution of chains of carbon atoms in the acid radicals within its triglyceride molecules. The nature and proportion of fatty acid radicals present at the 2-positions of the triglycerides in a fat can be determined by submitting the fat to lipase hydrolysis, which leaves the radicals at the 2-position unhydrolysed, removing the free acids formed and then liberating the 2-position acids by saponification and analysing them by standard methods. By trans index is meant the apparent trans content percent of the fatty acids providing the acid radicals of the triglycerides measured by the recommended method described in J. Amer. Oil Chemists' Soc., 1959, 36, 627–31, and calculated as methyl elaidate.

In practice the stable polymorphic form of the fat component B is beta, and that of the fat component A is beta, or more usually, beta prime.

Preferably at least 90% of the 2-positions in the triglycerides of both fat components A and B are occupied by a $C_{18}$ monoethenoic acid radical. Preferably the fat component A has from 15 to 40% of saturated $C_{18}$ and $C_{18}$ acids by weight of the total acids and preferably it has not more than 6% of other saturated fatty acids. Preferably it has a trans index of between 40 and 60.

Preferably the fat component B has at least 40%, and especially at least 50% of $C_{20}$ and $C_{22}$ acids; and preferably of these the $C_{22}$ acid predominates, for instance at least 75% of such acids is $C_{22}$ acid. Preferably the component B has a trans index of between 50 and 70. Preferably the fat component B has less than 12% of saturated fatty acid, and of this preferably substantially all is $C_{16}$ and $C_{18}$ acids. Preferably the trans index of the blend of fat components is between 50 and 70.

Preferably the temperatures at which the fat components A and B have a particular dilatation within the range of 750 to 1250, for instance 800, 1000 or 1200, are less than 15°, especially less than 10°, apart, so that the tendency for phase separation of component triglycerides that interact is reduced. In practice both components A and B have dilatations at 20° C. of at least 1000, preferably that of A is at least 1200; and the dilatation of the fat blend at 20° C. is at least 1050.

The presence in the blend of large amounts of polyethenoic acids is detrimental, and there should in practice be less than 10 and preferable less than 5% of them in the total fatty acids of either fat component. Preferably the fat component A has an iodine value of between 50 and 75, the fat component B one of between 65 and 80, and the composition one of between 50 and 80, especially between 60 and 76. The partial glyceride content of the blend should preferably be as low as possible.

Preferably the proportion of fat component A in the blend is such that the stable polymorphic form of the blend is beta prime; alternatively it is such that it is within 10% of that providing a maximum in the isodilatation curve of mixtures of fat components A and B for a dilatation of 1200, and preferably is that providing the maximum.

In one form of process according to the invention the blend of fat components A and B is formed directly by mixing the separate components. Mixing is in practice effected by adding together the components in the liquid state. An individual fat component can be prepared by selectively hardening to the required extent a natural oil containing polyethenoic acids in its triglycerides with isomerisation of cis acids to trans acids, followed if desired by fractionation; or a natural oil can be fractionated and then selectively hardened, with further fractionation if desired.

The conditions, including nature and quantity of catalyst, temperature and pressure, for a hydrogenation selective for the hardening of polyethenoic acids (which include diethenoic acids) to monoethenoic acids, are well-known. Conventional catalysts employed in such hydrogenations are conducive to the isomerisation of cis-ethenoic acids to trans-ethenoic acids, and a separate isomerisation step is unnecessary using them, but if isomerisation is required to bring the trans index of the hardened oil to the required value, the oil can be heated with an isomerising catalyst. It is convenient to use a sulphurised nickel catalyst, for instance one containing 4 to 10% of sulphur by weight of nickel, for the simultaneous hardening and isomerisation, or for a post-hardening isomerisation where this is required. Alternatively isomerisation can be effected before hardening. Palladium catalyst of satisfactory selectivity can also be used. Hydrogenation temperatures of 175° to 200° C. and pressures of about 1 to 6 atmospheres are generally convenient with a sulphurised nickel catalyst. Hydrogenation is preferably continued until polyethenoic acid has been substantially eliminated, as indicated by the iodine value reached in relation to the original acid content of the oil.

In most natural oils, especially vegetable oils, there is an unsaturated acid radical at the 2-position of their glycerides: on selective hydrogenation of such an oil containing polyethenoic acids up to the point where all polyethenoic acids have been converted to monoethenoic acids there is little increase in the saturated fatty acid content, and therefore the proportion of unsaturated fatty acid radicals at the 2-position is substantially undiminished. Hence all that is necessary to ensure that a fat component A or B has at least 85% of the 2-positions occupied by a $C_{18}$ monoethenoic acid radical is to take an appropriate starting material and selectively hydrogenate it to the required extent.

The fractionation of fats is also a well-known process: in the form of wet-fractionation known as solvent fractionation, fats are fractionally crystallised from a suitable solvent, for instance acetone; the softer fractions (oleines) composed of the lower melting glycerides remain behind in the solvent while the harder fractions (stearines) crystallise or precipitate in liquid form and are separated off.

Fat components A can be prepared from palm, olive, cottonseed, groundnut, safflower, sunflower, maize, and zero-erucic rapeseed oils, for example; and fat components B can be prepared from rapeseed oil of adequate $C_{20}$ and $C_{22}$ fatty acid content, or from other crucifera oils, for instance crambe oil (the oil from *Crambe abyssinica*): the preparation of fat components B in general is described in U.S. patent specification Ser. No. 749,970 filed Aug. 5, 1968 and now abandoned.

In another form of the process of the invention the blend is formed by preparing a mixture of suitable precursors of the fat components A and B such as those mentioned above and submitting it to an isomerisation and/or selective hydrogenation step to form the blend of fat components A and B in situ. The nature and relative proportions of fat components A and B in the product can be determined from the nature of the starting materials. The selective hydrogenation of the precursor mixture generally proceeds in the manner expected from the behaviour of the precursors in separate hydrogenations.

It is to be understood that where the blend is made either by direct mixing or by mixing precursors and hydrogenating, the fat components A and B can each arise from two or more natural fats or fat fractions. The several ingredient fats can be brought together in any order either before or after hydrogenation, and all that is necessary is that the final blend formed should meet the composition requirements of the invention.

A product of a process of the invention can be further upgraded by fractionation if desired.

The invention includes an edible fat composition which contains less 10% of polyethenoic acids by weight (of total fatty acids), from 25 to 55% of $C_{20}$ and $C_{22}$ monoethenoic acids, at least 35% of $C_{16}$ and $C_{18}$ acids, at least 85% of the acid residues at the 2-position of its triglycerides being derived from $C_{18}$ monoethenoic acid, the fat composition having dilatations of at least 1050 at 20° C. and less than 200 at 35° C., a trans index of between 40 and 60, an iodine value of between 50 and 80, and whose stable polymorphic form is beta prime. Preferably at least 75%, and especially at least 80% of the $C_{20}$ and $C_{22}$ acids is $C_{22}$ acid, and preferably the iodine value is between 60 and 76.

The invention is illustrated by the following examples and the isodilatation diagrams shown in FIGS. 1 to 7 of the accompanying drawings; temperatures are in ° C., and amounts of fatty acids in percent by weight of total fatty acids. The fat components A and B in each instance had at least 90% of the 2-positions of their glycerides occupied by a $C_{18}$ monoethenoic acid radical.

EXAMPLE 1

Preparation of fat component A1

A palm oleine fraction of iodine value 65.7 obtained by the solvent fractionation of palm oil and having the composition shown in Table 1a below was selectively hydrogenated using a non-pyrophoric sulphurised nickel on kieselguhr catalyst containing 43% of nickel and 6.8% of sulphur by weight of nickel. The oil fraction (100 parts by weight) and catalyst (0.5 part) were stirred together in a hydrogenation autoclave under nitrogen and heated to 185°: hydrogen gas was then introduced from the bottom of the vessel into the mixture stirred at 500 r.p.m., with replacement of the nitrogen by venting off and then operation of the hydrogenation autoclave as a dead end system. Hydrogen was rapidly introduced until a pressure of 34 lbs./in.² was attained, and hydrogen flow into the vessel then adjusted to maintain this pressure. Small samples of oil were removed by bleeding from time to time and their iodine value and slip melting point determined.

Hydrogenation was discontinued after 5 hours, when the iodine value of the filtered and cooled oil was 53.3 and its slip melting point was 38.6°. The dilatation of the hardened oil was measured at 20°, 30°, 35° and 40°, its trans index determined, and its fatty acid content analysed: the results are given in Table 1a. X-ray powder diffraction measurements showed that the fat crystallised in the stable beta prime form.

Preparation of fat component B1

A bleached and refined Danish (summer crop) rapeseed oil of acid value 0.1, saponification value 174 and iodine value 103.7 and compositions shown in Table 1a was selectively hydrogenated in the same way as the palm oleine fraction until in 5 hours it gave a hardened oil of the characteristics shown in Table 1a. X-ray measurements showed that this fat crystallised in the beta prime polymorphic form, but that this slowly changed to the stable beta form.

TABLE 1a

|  | Palm oleine fraction starting material | Component A1 | Rapeseed oil starting material | Component B1 |
|---|---|---|---|---|
| Iodine value | 65.7 | 53.3 | 103.7 | 75.5 |
| Slip M.P., degrees |  | 38.6 |  | 33.7 |
| Trans index, percent |  | 46 |  | 66 |
| Dilatations: |  |  |  |  |
| $D_{20}$ |  | 1,700 |  | 1,370 |
| $D_{30}$ |  | 1,165 |  | 445 |
| $D_{35}$ |  | 595 |  | 30 |
| $D_{40}$ |  | 100 |  | 0 |
| Fatty acids: |  |  |  |  |
| Saturated: |  |  |  |  |
| $C_{16}$ | 31.4 | 31.7 | 3.5 | 3.4 |
| $C_{18}$ | 4.9 | 5.1 | 1.1 | 1.9 |
| $C_{20}$ | 0.4 | 1.2 | 0 | 0 |
| $C_{22}$ | 0 | 0 | 0.4 | 1.3 |
| Unsaturated: |  |  |  |  |
| $C_{18}$ monoene | 48.7 | 62.0 | 16.3 | 40.2 |
| $C_{18}$ diene | 14.0 | 0.7 | 14.3 | 0 |
| $C_{18}$ triene | 0.3 | 0 | 9.7 | 0 |
| $C_{20}$ monoene | 0 | 0 | 8.1 | 8.1 |
| $C_{22}$ monoene | 0 | 0 | 46.4 | 45.1 |

Blending of fat components A and B

Blends of the fat components A1 and B1 were made by mixing them in varying proportions and their dilatation values at various temperatures were determined. The latent heat of fusion L of various compositions was determined by differential thermal analysis on samples heated to above 60° for 1 hour, and then cooled in melting ice for 90 minutes, and the polymorphic form F of compositions crystallised more than 3 weeks earlier was also determined. The results were as indicated in Table 1b.

TABLE 1b

| Proportions | | Dilatations | | | | | | L, cal./g. | F |
|---|---|---|---|---|---|---|---|---|---|
| A1 | B1 | $D_{20}$ | $D_{25}$ | $D_{30}$ | $D_{35}$ | $D_{40}$ | $D_{45}$ |  |  |
| 0 | 100 | 1,370 |  | 445 | 30 | 10 | 0 | 20.1 | Beta. |
| 5 | 95 |  |  |  |  |  |  |  | Do. |
| 10 | 90 | 1,420 | 1,160 | 545 | 40 | 10 | 0 |  |  |
| 15 | 85 |  |  |  |  |  |  |  | Beta plus beta prime. |
| 25 | 75 | 1,475 | 1,225 | 635 | 85 | 10 | 0 | 24.5 | Beta prime. |
| 40 | 60 | 1,445 | 1,195 | 610 | 75 | 10 | 0 |  |  |
| 50 | 50 |  |  |  |  |  |  | 21.2 | Do. |
| 55 | 45 | 1,420 | 1,175 | 585 | 70 | 20 | 0 |  |  |
| 70 | 30 | 1,445 | 1,205 | 650 | 200 | 20 | 0 |  |  |
| 75 | 25 |  |  |  |  |  |  | 24.9 |  |
| 85 | 15 | 1,515 | 1,320 | 850 | 380 | 15 | 0 |  |  |
| 100 | 0 | 1,700 |  | 1,165 | 595 | 100 | 0 | 30.3 | Do. |

An isodilatation diagram was constructed as described above and is shown in FIG. 1. It shows a maximum at 25% A1:75% B1 composition at below 30°, tending to shift to a composition with slightly increased A1 content (33%) at higher temperatures. Compositions containing from 10 to 40% A1 correspond to the main part of the peak. The maximum corresponds to the steepest dilatation curve. The latent heat data indicate a similar maximum. The polymorphic form of the 25% A1:75% B1 freshly crystallised composition was also shown to be beta prime.

EXAMPLE 2

The palm oleine fraction of Example 1 (40 parts by weight) and the rapeseed oil of Example 1 (60 parts by weight) were mixed, and the mixture selectively hydrogenated for 6 hours by the process described in Example 1, to give a fat composition of the invention whose characteristics were as follows:

|  |  | Dilatations |
|---|---|---|
| Iodine value, 66.5 | $D_{20}$ | 1,450 |
| Slip M.P., 33.9° | $D_{30}$ | 590 |
| Stable polymorphic form, beta prime | $D_{35}$ | 65 |
|  | $D_{40}$ | 10 |

The dilatation values show that the product was similar to the 40% A1, 60% B1 blend of Example 1, indicating that mixing of precursor oils followed by hydrogenation is equivalent to separate hydrogenation followed by mixing.

EXAMPLE 3

The palm oleine fraction of Example 1 (25 parts by weight) and the rapeseed oil of Example 1 (75 parts) were mixed, and the mixture selectively hydrogenated for 2 hours by the process described in Example 1, to give a fat composition (a). Further products (b) and (c) were made similarly except that hydrogenation was maintained for 3 hours and 3½ hours respectively. The products had the following characteristics.

|  | (a) | (b) | (c) |
|---|---|---|---|
| Duration of hydrogenation (hr.) | 2 | 3 | 3.5 |
| Iodine value | 71.2 | 70.2 | 69.2 |
| Slip M.P., degrees | 32.3 | 33.8 | 34.3 |
| Dilatations: |  |  |  |
| $D_{20}$ | 1,310 | 1,450 | 1,480 |
| $D_{30}$ | 375 | 575 | 640 |
| $D_{35}$ | 10 | 65 | 100 |
| $D_{40}$ | 5 | 5 | 5 |

The stable polymorphic form of the crystallised fat (c) was found to be beta prime.

EXAMPLE 4

Preparation of fat component A2

A cottonseed oil of iodine value 105 and having the composition shown in Table 4a was selectively hydrogenated in the same way as the palm oleine fraction of Example 1, except that one part by weight of catalyst was used to 100 parts of oil, until in 6 hours it gave a hardened oil of the characteristics shown in Table 4a.

Preparation of fat component B2

A second batch of the rapeseed oil of Example 1 was selectively hydrogenated as described there, giving a hardened oil of the characteristics shown in Table 4a.

TABLE 4a

|   | Cottonseed oil starting material | Component A2 | Component B2 |
|---|---|---|---|
| Iodine value | 105 | 62.4 | 75.2 |
| Slip M.P., degrees |  | 39.6 | 33.1 |
| Trans index, percent |  | 49 | 65 |
| Dilatations: |  |  |  |
| $D_{20}$ |  | 1,585 | 1,355 |
| $D_{30}$ |  | 1,105 | 400 |
| $D_{35}$ |  | 605 | 15 |
| $D_{40}$ |  | 130 | 10 |
| $D_{45}$ |  | 10 |  |
| Fatty acids: |  |  |  |
| Saturated: |  |  |  |
| $C_{16}$ | 25.0 | 25.1 | 3.4 |
| $C_{18}$ | 3.0 | 4.5 | 1.9 |
| $C_{20}$ | 1.0 | 1.1 | 0.3 |
| $C_{22}$ | 0 | 0 | 1.3 |
| Unsaturated: |  |  |  |
| $C_{16}$ monoene | 0 | 0.9 | 0 |
| $C_{18}$ monoene | 18.9 | 62.5 | 38.1 |
| $C_{18}$ diene | 51.0 | 5.5 | 2.1 |
| $C_{18}$ triene | 0 | 0 | 0 |
| $C_{20}$ monoene | 1.0 | 0.6 | 7.9 |
| $C_{22}$ monoene | 0 | 0 | 45.8 |
| Stable polymorphic form |  | (1) | Beta |

[1] Beta prime.

Blending of fat components A and B

Blends of the fat components A2 and B2 were made as before, with dilatations shown in Table 4b.

TABLE 4b

| Proportions |  | Dilatations |  |  |  |  |  |
|---|---|---|---|---|---|---|---|
| A2 | B2 | $D_{20}$ | $D_{25}$ | $D_{30}$ | $D_{35}$ | $D_{40}$ | $D_{45}$ |
| 0 | 100 | 1,355 |  | 400 | 15 | 10 |  |
| 15 | 85 | 1,395 | 1,115 | 615 | 75 | 0 |  |
| 30 | 70 | 1,430 | 1,150 | 675 | 90 | 0 |  |
| 50 | 50 | 1,330 | 1,080 | 630 | 85 | 0 |  |
| 70 | 30 | 1,300 | 1,045 | 625 | 180 | 0 |  |
| 85 | 15 | 1,405 | 1,215 | 880 | 390 | 55 | 0 |
| 100 | 0 | 1,585 |  | 1,105 | 605 | 130 | 10 |

An isodilatation diagram was constructed as described above and is shown in FIG. 2. It shows a maximum at 30% A2:70% B2 composition at 20°, tending to shift to a composition with slightly decreased A2 content (25%) at 30–35°. Compositions containing from 10 to 50% A2 cover the main part of the peak. The maximum corresponds to the steepest dilatation curve. The polymorphic form of the freshly crystallised 30% A2:70% B2 composition was found to be beta prime, and this was found to be stable.

EXAMPLE 5

Preparation of fat component A3

A groundnut oil of iodine value 86.2 and having the composition shown in Table 5a was selectively hydrogenated in the same way as the palm oleine fraction of Example 1, except that 1 part by weight of catalyst was used to 100 parts of oil, until in 7 hours it gave a hardened oil of the characteristics shown in Table 5a.

Preparation of fat component B3

A third batch of the rapeseed oil of Example 1 was selectively hydrogenated as described there, giving after 4 hours a hardened oil of the characteristics shown in Table 5a.

TABLE 5a

|   | Groundnut oil starting material | Component A3 | Component B3 |
|---|---|---|---|
| Iodine value | 86.2 | 67.7 | 75.8 |
| Slip M.P., degrees |  | 36.0 | 32.3 |
| Trans index, percent |  | 50 | 65 |
| Dilatations: |  |  |  |
| $D_{20}$ |  | 1,435 | 1,300 |
| $D_{25}$ |  | 1,205 |  |
| $D_{30}$ |  | 740 | 345 |
| $D_{35}$ |  | 205 | 0 |
| $D_{40}$ |  | 0 |  |
| Fatty acids: |  |  |  |
| Saturated: |  |  |  |
| $C_{16}$ | 9.9 | 10.2 | 3.7 |
| $C_{18}$ | 3.3 | 6.9 | 1.5 |
| $C_{20}$ | 2.5 | 2.1 | 0.2 |
| $C_{22}$ | 2.7 | 2.1 | 1.4 |
| Unsaturated: |  |  |  |
| $C_{16}$ monoene | 0.5 | 0.1 | 0 |
| $C_{18}$ monoene | 53.9 | 77.6 | 37.0 |
| $C_{18}$ diene | 24.2 | 0 | 3.2 |
| $C_{18}$ triene | 1.0 | 0 | 0 |
| $C_{20}$ monoene | 2.0 | 1.2 | 7.9 |
| $C_{22}$ monoene | 0 | 0 | 45.2 |
| Stable polymorphic form |  | (1) | Beta |

[1] Beta prime.

Blending of fat components A and B

Blends of the fat components A3 and B3 were made as before, with dilatations shown in Table 5b.

TABLE 5b

| Proportions |  | Dilatations |  |  |  |  |
|---|---|---|---|---|---|---|
| A3 | B3 | $D_{20}$ | $D_{25}$ | $D_{30}$ | $D_{35}$ | $D_{40}$ |
| 0 | 100 | 1,300 |  | 345 | 0 |  |
| 5 | 95 | 1,300 | 960 | 350 | 0 | 0 |
| 15 | 85 | 1,340 | 1,040 | 550 | 0 | 0 |
| 25 | 75 | 1,340 | 1,060 | 550 | 20 | 0 |
| 50 | 50 | 1,300 | 1,010 | 510 | 55 | 0 |
| 75 | 25 | 1,265 | 975 | 540 | 65 | 0 |
| 85 | 15 | 1,315 | 1,035 | 550 | 120 | 0 |
| 95 | 5 | 1,385 | 1,110 | 670 | 170 | 0 |
| 100 | 0 | 1,435 | 1,205 | 740 | 205 | 0 |

An isodilatation diagram was constructed as described above and is shown in FIG. 3. It shows a maximum at 20% A3:80% B3 composition at 20°, tending to shift to a composition with slightly increased A3 content (30%) at 30–35°. Compositions containing from 10 to 50% A3 cover the main part of the peak. The maximum corresponds to the steepest dilatation curve. The polymorphic form of the freshly crystallised 25% A3:75% B3 composition was found to be beta prime, and this was found to be stable.

EXAMPLE 6

Preparation of fat component A4

A zero-erucic rapeseed oil of iodine value 113.0 and having the composition shown in Table 6a was selectively hydrogenated in the same way as the palm oleine fraction of Example 1, except that the pressure was 24 lbs./in.$^2$, temperature was 200° C., stirring speed was 300 r.p.m. and 1.5 parts by weight of catalyst were used to 100 parts of oil, until in 9½ hours it gave a hardened oil of the characteristics shown in Table 6a.

The hardened oil (100 parts by grams-weight) and dry acetone (900 parts by cc.-volume) were mixed and heated to 40°, then cooled to 10° during 15 minutes, the mixture allowed to stand for 30 minutes, the crystallised fat filtered off and washed three times with acetone (150 parts each time) at 10°: the washed crystals were heated to drive off most of the acetone remaining, and the small amount of residual acetone was removed by heating in a vacuum still, giving in 36% yield a stearine fraction of selectively hydrogenated zero-erucic rapeseed oil of the characteristics shown in Table 6a.

Preparation of fat component B4

The selectively hydrogenated rapeseed oil B1 of Example 1 was fractionally crystallised from acetone in a similar manner, except only that cooling was effected in 6 minutes: the yield of stearine fraction was 60% and it had the characteristics shown in Table 6a.

TABLE 6a

| | Zero-erucic rapeseed oil | Hardened rapeseed oil | Component A4 | Component B4 |
|---|---|---|---|---|
| Iodine value | 113.0 | 77.3 | 70.0 | 72.5 |
| Slip M.P., degrees | | 31.9 | 45.0 | 35.0 |
| Trans index, percent | | 68 | 70 | 67 |
| Dilatations: | | | | |
| $D_{20}$ | | 1,080 | 1,920 | 1,740 |
| $D_{25}$ | | | 1,850 | 1,560 |
| $D_{30}$ | | 300 | 1,555 | 1,105 |
| $D_{35}$ | | 80 | 725 | 180 |
| $D_{40}$ | | 5 | 395 | 15 |
| $D_{45}$ | | | 110 | |
| Fatty acids: | | | | |
| Saturated: | | | | |
| $C_{16}$ | 3.8 | 5.0 | 6.5 | 4.3 |
| $C_{18}$ | 1.1 | 5.5 | 10.3 | 2.2 |
| $C_{20}$ | 0.2 | 0 | 1.4 | 1.7 |
| $C_{22}$ | 0 | 0 | 0 | 1.7 |
| Unsaturated: | | | | |
| $C_{16}$ monoene | 0 | 0 | 0 | 0 |
| $C_{18}$ monoene | 62.4 | 84.9 | 76.3 | 35.4 |
| $C_{18}$ diene | 19.8 | 3.5 | 3.9 | 0 |
| $C_{18}$ triene | 12.8 | 0 | 0 | 0 |
| $C_{20}$ monoene | 0 | 1.0 | 1.6 | 8.8 |
| $C_{22}$ monoene | 0 | 0 | 0 | 45.9 |
| Stable polymorphic form | | | Beta | Beta |

Blending of fat components A and B

Blends of the fat components A4 and B4 were made as before, with dilatations shown in Table 6b.

TABLE 6b

| Proportions | | Dilatations | | | | | |
|---|---|---|---|---|---|---|---|
| A4 | B4 | $D_{20}$ | $D_{25}$ | $D_{30}$ | $D_{35}$ | $D_{40}$ | $D_{45}$ |
| 0 | 100 | 1,740 | 1,560 | 1,105 | 180 | 15 | |
| 10 | 90 | 1,755 | 1,605 | 1,190 | 305 | 15 | |
| 25 | 75 | 1,775 | 1,640 | 1,280 | 435 | 10 | |
| 40 | 60 | 1,635 | 1,455 | 1,085 | 355 | 10 | |
| 50 | 50 | 1,790 | 1,640 | 1,175 | 390 | 10 | |
| 60 | 40 | 1,760 | 1,585 | 1,070 | 325 | 25 | |
| 75 | 25 | 1,785 | 1,595 | 1,065 | 285 | 20 | |
| 90 | 10 | 1,830 | 1,680 | 1,255 | 445 | 80 | |
| 100 | 0 | 1,920 | 1,850 | 1,555 | 725 | 395 | 110 |

An isodilatation diagram was constructed as described above and is shown in FIG. 4. It shows a maximum at 25% A4:75% B4 composition: compositions containing from 10 to 50% A4 cover the main part of the peak. The polymorphic form of the freshly crystallised 25% A4:75% B4 composition was found to be beta prime, and this was found to be stable.

EXAMPLE 7

Preparation of fat component A5

The selectively hydrogenated cottonseed oil A2 of Example 4 was fractionally crystallised from acetone by the procedure described for fat component A4 in Example 6, except that 100 parts by grams-weight of hardened oil to 500 parts by cc.-volume of acetone were used, cooling was from 40° to 0° in 40 minutes, and the washing acetone was at 0° and 120 parts were used for each wash.

The stearine fraction, obtained in 80% yield, had the characteristics shown in Table 7a.

Preparation of fat component B5

The selectively hydrogenated rapeseed oil of Example 5 (fat component B3) was fractionally crystallised from acetone using the procedure described for fat component A4 in Example 6, to give a stearine fraction in 55% yield having the characteristics shown in Table 7a.

TABLE 7a

| | Component A5 | Component B5 |
|---|---|---|
| Iodine value | 60.3 | 72.7 |
| Slip M.P., degrees | 42.7 | 34.2 |
| Trans index, percent | 50 | 66 |
| Dilatations: | | |
| $D_{20}$ | 1,765 | 1,715 |
| $D_{25}$ | 1,690 | 1,560 |
| $D_{30}$ | 1,435 | 945 |
| $D_{35}$ | 970 | 160 |
| $D_{40}$ | 290 | 0 |
| $D_{45}$ | 5 | |
| Fatty acids: | | |
| Saturated: | | |
| $C_{16}$ | 26.7 | 4.8 |
| $C_{18}$ | 6.0 | 2.3 |
| $C_{20}$ | 1.2 | 1.1 |
| $C_{22}$ | 0 | 1.1 |
| Unsaturated: | | |
| $C_{16}$ monoene | 0.8 | 0 |
| $C_{18}$ monoene | 62.0 | 34.1 |
| $C_{18}$ diene | 2.7 | 0 |
| $C_{20}$ monoene | 0.6 | 8.5 |
| $C_{22}$ monoene | 0 | 48.0 |
| Stable polymorphic form | (1) | Beta |

[1] Beta prime.

Blending of fat components A and B

Blends of the fat components A5 and B5 were made as before, with dilatations shown in Table 7b.

TABLE 7b

| Proportions | | Dilatations | | | | | |
|---|---|---|---|---|---|---|---|
| A5 | B5 | $D_{20}$ | $D_{25}$ | $D_{30}$ | $D_{35}$ | $D_{40}$ | $D_{45}$ |
| 0 | 100 | 1,715 | 1,560 | 945 | 160 | 0 | |
| 5 | 95 | 1,740 | 1,570 | 960 | 165 | 15 | |
| 15 | 85 | 1,750 | 1,625 | 1,080 | 270 | 10 | |
| 25 | 75 | 1,770 | 1,655 | 1,140 | 335 | 10 | |
| 50 | 50 | 1,695 | 1,560 | 1,005 | 380 | 10 | |
| 75 | 25 | 1,695 | 1,550 | 1,025 | 445 | 45 | |
| 85 | 15 | 1,635 | 1,475 | 1,045 | 570 | 105 | |
| 95 | 5 | 1,815 | 1,765 | 1,445 | 870 | 210 | |
| 100 | 0 | 1,765 | 1,690 | 1,435 | 970 | 290 | 5 |

Figure 5:
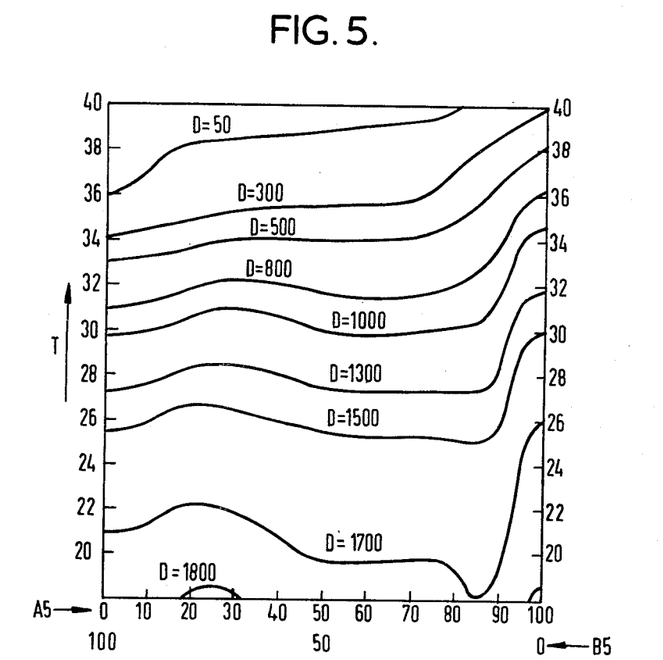

The isodilatation diagram of FIG. 5 was constructed from these results. It shows a maximum at 25% A5; 75% B5 composition: compositions containing from 10 to 50% A5 cover the main part of the peak. The polymorphic form of the freshly crystallised 25% A5:75% B5 composition was found to be beta prime, and this was found to be stable.

EXAMPLE 8

Preparation of fat component B6

A neutral crambe oil of acid value 0.50, saponification value 169.4, iodine value 95.3 and fatty acid composition shown in Table 8a was selectively hydrogenated under the conditions described for the palm oleine fraction of Example 1. Hydrogenation was completed in 7 hours and the hardened oil had the characteristics shown in Table 8a.

The hardened oil was fractionally crystallised from acetone using the procedure described for fat component A4 in Example 6, to give a stearine fraction in 60% yield having the characteristics shown in Table 8a.

TABLE 8a

| | Starting material | Hardened oil | Fat component B6 |
|---|---|---|---|
| Iodine value | 95.3 | 74.6 | 72.4 |
| Slip M.P., degrees | | 33.0 | 37.0 |
| Trans index, percent | | 63 | 65 |
| Dilatations: | | | |
| $D_{20}$ | | 1,345 | 1,770 |
| $D_{25}$ | | | 1,675 |
| $D_{30}$ | | 460 | 1,220 |
| $D_{35}$ | | 70 | 395 |
| $D_{40}$ | | 5 | 45 |
| Fatty acids: | | | |
| Saturated: | | | |
| $C_{16}$ | 2.8 | 2.8 | 2.7 |
| $C_{18}$ | 0.8 | 1.3 | 1.7 |
| $C_{20}$ | 0.3 | 0.3 | 1.3 |
| $C_{22}$ | 0.5 | 2.4 | 3.9 |
| Unsaturated: | | | |
| $C_{16}$ monoene | | | 0.7 |
| $C_{18}$ monoene | 15.9 | 32.6 | 30.2 |
| $C_{18}$ diene | 10.2 | 1.6 | 1.5 |
| $C_{18}$ triene | 7.8 | 0 | 0 |
| $C_{20}$ monoene | 4.8 | 3.3 | 3.8 |
| $C_{22}$ monoene | 56.8 | 55.5 | 54.2 |
| Stable polymorphic form | | | Beta |

Blending of fat components A and B

Blends of the fat components A4 (see Example 6) and B6 were made as before, with dilatations shown in Table 8b.

TABLE 8b

| Proportions | | Dilatations | | | | | |
|---|---|---|---|---|---|---|---|
| A4 | B6 | $D_{20}$ | $D_{25}$ | $D_{30}$ | $D_{35}$ | $D_{40}$ | $D_{45}$ |
| 0 | 100 | 1,770 | 1,675 | 1,220 | 395 | 45 | |
| 10 | 90 | 1,820 | 1,700 | 1,190 | 315 | 10 | |
| 25 | 75 | 1,865 | 1,780 | 1,310 | 390 | 5 | |
| 40 | 60 | 1,865 | 1,825 | 1,395 | 490 | 10 | |
| 50 | 50 | 1,850 | 1,775 | 1,290 | 475 | 20 | |
| 60 | 40 | 1,825 | 1,705 | 1,135 | 400 | 20 | |
| 75 | 25 | 1,825 | 1,645 | 1,020 | 280 | 10 | |
| 90 | 10 | 1,875 | 1,700 | 1,240 | 430 | 100 | |
| 100 | 0 | 1,920 | 1,850 | 1,555 | 725 | 395 | 110 |

Figure 6:
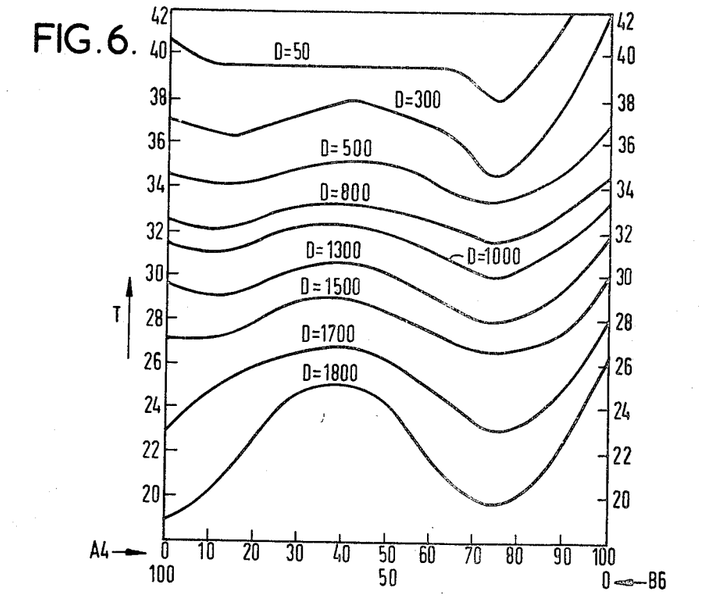
Figure 7:
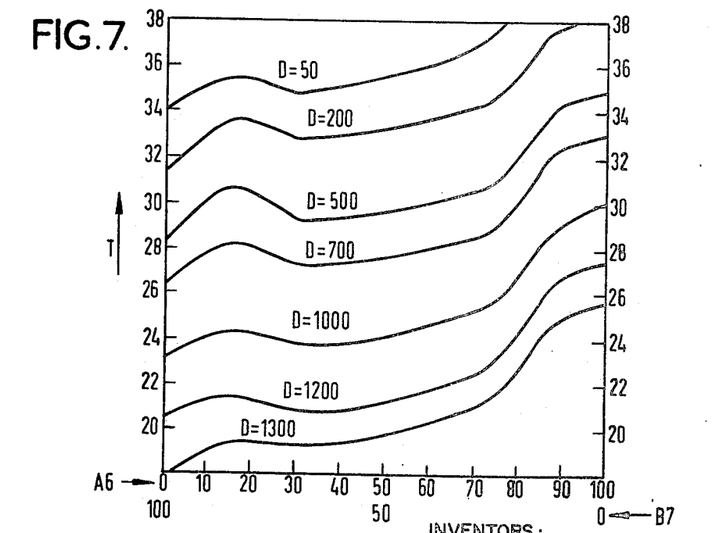

The isodilatation diagram of FIG. 6 was constructed from these results. It shows a maximum at 40% A4:60% B6 composition, with the main part of the peak corresponding to from 20 to 50% A4. The maximum corresponds to the steepest dilatation curve. The polymorphic form of the freshly crystallised 25% A4:75% B6 composition was found to be beta prime, and this was found to be stable.

EXAMPLE 9

Preparation of fat component A6

A second batch of the palm oleine fraction of Example 1 was selectively hydrogenated as described there, except that the hydrogenation temperature was 180°, giving after 5 hours a hardened oil of the characteristics shown in Table 9a.

Preparation of fat component B7

An oleine fraction obtained by acetone fractionation of a selectively hardened rapeseed oil, and having the characteristics shown in Table 9a, was selectively hydrogenated by the procedure described in Example 1 for fat component A1 except that 1 part of the catalyst to 100 parts of oil were used and the temperature was 185°. The hardened product obtained after 2 hours hydrogenation had the characteristics shown in Table 9a.

TABLE 9a

| | Component A6 | Hardened rapeseed oleine fraction | Component B7 |
|---|---|---|---|
| Iodine value | 53.5 | 81.0 | 75.8 |
| Slip M.P., degrees | 37.1 | 28.0 | 32.7 |
| Trans index, percent | 45 | 53 | 62 |
| Dilatations: | | | |
| $D_{20}$ | 1,640 | 320 | 1,225 |
| $D_{25}$ | | 110 | 855 |
| $D_{30}$ | 1,010 | 15 | 390 |
| $D_{35}$ | 520 | | 50 |
| $D_{40}$ | 40 | | 0 |
| Fatty acids: | | | |
| Saturated: | | | |
| $C_{16}$ | 31.8 | 3.6 | 3.3 |
| $C_{18}$ | 5.3 | 1.1 | 3.2 |
| $C_{20}$ | 0.2 | 0.3 | 1.5 |
| $C_{22}$ | 0 | 0.8 | 3.2 |
| Unsaturated: | | | |
| $C_{16}$ monoene | 0 | | 0.3 |
| $C_{18}$ monoene | 61.6 | 31.0 | 27.7 |
| $C_{18}$ diene | 1.1 | 8.2 | 5.6 |
| $C_{20}$ monoene | 0 | 10.5 | 9.4 |
| $C_{22}$ monoene | 0 | 45.0 | 45.6 |

Blending of fat components A and B

Blends of the fat components A6 and B7 were made as before, with dilatations shown in Table 9b.

TABLE 9b

| Proportions | | Dilatations | | | | |
|---|---|---|---|---|---|---|
| A6 | B6 | $D_{20}$ | $D_{25}$ | $D_{30}$ | $D_{35}$ | $D_{40}$ |
| 0 | 100 | 1,225 | 855 | 390 | 50 | 0 |
| 15 | 85 | 1,275 | 950 | 530 | 40 | 0 |
| 30 | 70 | 1,260 | 915 | 425 | 40 | 10 |
| 50 | 50 | 1,285 | 930 | 450 | 35 | 10 |
| 75 | 25 | 1,365 | 1,020 | 560 | 150 | 10 |
| 85 | 15 | 1,510 | 1,255 | 865 | 360 | 20 |
| 100 | 0 | 1,640 | | 1,010 | 520 | 40 |

An isodilatation diagram was constructed as described above and is shown in FIG. 7. It shows a maximum at 15% A6:85% B7 composition, with the main part of the peak corresponding to from 10 to 22% A6.

The edible fats produced by a process of the invention can be used as substitutes for chocolate fats, in toffees, cake coatings and biscuit filling creams. Thus a chocolate material can be made by formulating the product with suitable flavouring, for instance cocoa powder, sugar, milk powder, and lecithin. Suitable formulations of products illustrated by the edible fat products of Example 3 are as follows:

|  | Parts by wt. |
|---|---|
| Formulation A (milk chocolate): | |
| Edible fat (b) of Example 3 | 35.5 |
| Cocoa powder (containing 10–12% cocoa-butter) | 5 |
| Icing sugar | 43 |
| Skim milk powder | 16.5 |
| Lecithin | 0.45 |
| Formulation B (milk chocolate): | |
| Edible fat (b) of Example 3 | 30 |
| Cocoa powder (containing 10–12% cocoa-butter) | 5 |
| Icing sugar | 43 |
| Full cream milk powder | 22 |
| Lecithin | 0.45 |
| Formulation C (toffee): | |
| Edible fat (b) of Example 3 | 6 |
| Granulated sugar | 12 |
| Glucose | 12 |
| Full cream sweetened condensed milk | 12 |
| Water | 1 |
| Formulation D (biscuit filling cream): | |
| Edible fat (a) of Example 3 | 40 |
| Icing sugar | 60 |

We claim:

1. A process for preparing an edible fat composition, comprising by contacting in the liquid state (a) from 10 to 50% by weight of an unrandomised fat component A the total fatty acids of whose triglycerides have a $C_{16}$ and $C_{18}$ acid content of at least 90% by weight, of which from 10 to 45% is saturated fatty acid, and (b) from 90 to 50% of an unrandomised fat component B the total fatty acids of whose triglycerides have a $C_{20}$ and $C_{22}$ acid content of from 30 to 75% by weight and not more than 20% of saturated fatty acid, both components A and B having at least 85% of the 2-positions occupied by a $C_{18}$ monoethenoic acid radical, and a trans index of between 40 and 75.

2. A process according to claim 1, where the fat component A has from 15 to 40% of saturated $C_{16}$ and $C_{18}$ acids.

3. A process according to claim 2, where the fat component B has at least 50% of $C_{20}$ and $C_{22}$ acids.

4. A process according to claim 3, where at least 75% of the total $C_{20}$ and $C_{22}$ acids in the fat component B is $C_{22}$ acid.

5. A process according to claim 3, where the fat component A has not more than 6% of saturated fatty acids other than $C_{16}$ and $C_{18}$ acids.

6. A process according to claim 3, where the fat component B has less than 12% of saturated fatty acid.

7. A process according to claim 6, where the fat component A has a trans index of between 40 and 60 and an iodine value of between 50 and 75.

8. A process according to claim 7, where the fat component B has a trans index of between 50 and 70, and an iodine value of between 65 and 80.

9. A process according to claim 8, where the total fatty acids of the fat components A and B contain less than 5% of polyethenoic acids.

10. A process according to claim 8, where the fat component B is one prepared from rapeseed or crambe oil.

11. A process according to claim 10, where the fat component A is one prepared from palm, cottonseed, groundnut or zero-erucic rapeseed oil.

12. A process according to claim 1, where the stable polymorphic form of the fat component B is beta and that of the fat component A is beta prime.

13. A process according to claim 1, in which the proportion of fat component A in the blend is such that the stable polymorphic form of the blend is beta prime.

14. An edible fat composition prepared by contacting in the liquid state (a) from 10 to 50% by weight of an unrandomised fat component A the total fatty acids of whose triglycerides have a $C_{16}$ and $C_{18}$ acid content of at least 90% by weight, of which from 10 to 45% is saturated fatty acid, and (b) from 90 to 50% of an unrandomised fat component B the total fatty acids of whose triglycerides have a $C_{20}$ and $C_{22}$ acid content of from 30 to 75% by weight and not more than 20% of saturated fatty acid, both components A and B having at least 85% of the 2-positions occupied by a $C_{18}$ monoethenoic acid radical, and a trans index of between 40 and 75.

References Cited

UNITED STATES PATENTS

| | | | |
|---|---|---|---|
| 2,972,541 | 2/1961 | Cochran et al. | 99—118 H |
| 3,361,568 | 1/1968 | Kidger | 99—118 H |

JOSEPH M. GOLIAN, Primary Examiner

U.S. Cl. X.R.

99—118 H